United States Patent
Liu (10) Patent No.: US 11,182,211 B2
(45) Date of Patent: Nov. 23, 2021

(54) TASK ALLOCATION METHOD AND TASK ALLOCATION APPARATUS FOR DISTRIBUTED DATA CALCULATION

(71) Applicant: Hangzhou Hikvision Digital Technology Co., Ltd., Zhejiang (CN)

(72) Inventor: Zhihui Liu, Zhejiang (CN)

(73) Assignee: HANGZHOU HIKVISION DIGITAL TECHNOLOGY CO., LTD, Zhejiang (CN)

( * ) Notice: Subject to any disclaimer, the term of this patent is extended or adjusted under 35 U.S.C. 154(b) by 405 days.

(21) Appl. No.: 15/749,999

(22) PCT Filed: May 25, 2016

(86) PCT No.: PCT/CN2016/083279
§ 371 (c)(1),
(2) Date: Feb. 2, 2018

(87) PCT Pub. No.: WO2017/020637
PCT Pub. Date: Feb. 9, 2017

(65) Prior Publication Data
US 2018/0232257 A1 Aug. 16, 2018

(30) Foreign Application Priority Data
Aug. 5, 2015 (CN) .......................... 201510472782.3

(51) Int. Cl.
G06F 9/46 (2006.01)
G06F 9/50 (2006.01)
G06F 16/27 (2019.01)

(52) U.S. Cl.
CPC .......... *G06F 9/5016* (2013.01); *G06F 9/5066* (2013.01); *G06F 9/5077* (2013.01); *G06F 16/27* (2019.01)

(58) Field of Classification Search
CPC .... G06F 9/5016; G06F 9/5066; G06F 9/5077; G06F 16/27
(Continued)

(56) References Cited

U.S. PATENT DOCUMENTS 5,813,025 A * 9/1998 Murphy ................ G06F 3/0608
711/114
8,418,181 B1 4/2013 Sirota et al.
(Continued)

FOREIGN PATENT DOCUMENTS

CN 103019853 A 4/2013
CN 104219279 A 12/2014
(Continued)

OTHER PUBLICATIONS

"Spark Programming Guide", Aug. 31, 2014 (Year: 2014).*
(Continued)

*Primary Examiner* — Bradley A Teets
(74) *Attorney, Agent, or Firm* — Shumaker, Loop & Kendrick, LLP (57) ABSTRACT

The present application discloses a task allocation method and task allocation apparatus for distributed data computing. The task allocation method includes: receiving storage parameters for target data to be computed in distributed data; mapping data slices of the target data to a resilient distributed dataset based on the storage parameters, each data slice corresponding respectively to a partition in the resilient distributed dataset; assigning each partition to a storage node to generate a computing task and perform the computing tasks. By using data storage information in a distributed database to allocate computing tasks to storage nodes corresponding to the data, Only data in local memories need to be called during the computing process, IO redundancy and time consumed due to repeated data forwarding are reduced.

7 Claims, 5 Drawing Sheets

(58) Field of Classification Search
USPC .......................................................... 718/104
See application file for complete search history.

(56) References Cited

U.S. PATENT DOCUMENTS

| | | | |
|---|---|---|---|
| 9,338,234 B2* | 5/2016 | Li ....................... | H04L 67/1097 |
| 9,369,782 B2* | 6/2016 | Haghighat-Kashani ..................... | |
| | | | H04Q 9/00 |
| 2011/0258246 A1 | 10/2011 | Khandekar et al. | |
| 2013/0232184 A1 | 9/2013 | Grube et al. | |
| 2014/0059277 A1* | 2/2014 | Chung .................. | G06F 3/0604 |
| | | | 711/103 |
| 2015/0066646 A1 | 3/2015 | Sriharsha et al. | |
| 2015/0156276 A1* | 6/2015 | Xue .................... | H04L 67/1008 |
| | | | 709/203 |

FOREIGN PATENT DOCUMENTS

| | | |
|---|---|---|
| CN | 104360903 A | 2/2015 |
| JP | 2011170649 A | 9/2011 |

OTHER PUBLICATIONS

Written Opinion (native language) and Translation of International Search Report (English) for corresponding International Application No. PCT/CN2016/083279; 5 pages; dated Jul. 25, 2016.
International Search Report (ISR) (and English translation) for PCT/CN2016/083279 dated Jul. 25, 2016.
(English Abstract) Tao Gu "Research on Key Issues of Task and Job Scheduling for MapReduce Clusters", China Doctoral Dissertations Full-Text Database, No. 4, Apr. 15, 2015 (ISSN: 1674-022X).

* cited by examiner

TASK ALLOCATION METHOD AND TASK ALLOCATION APPARATUS FOR DISTRIBUTED DATA CALCULATION

The present application claims the priority to a Chinese patent application No. 201510472782.3 filed with the State Intellectual Property Office of People's Republic of China on Aug. 5, 2015 and entitled "Task Allocation Method and Task Allocation Apparatus for Distributed Data Calculation", which is incorporated herein by reference in its entirety.

TECHNICAL FIELD

The application relates to the technical field of video surveillance, and, in particular, to a task allocation method and task allocation apparatus for distributed data computing.

BACKGROUND

Currently, there are mainly two data initialization modes for resilient distributed datasets (RDDs) in Spark. One is that data are obtained directly from a set and saved into RDDs, and the other is that local files or files of distributed file systems (such as HDFS and S3) such as text files and sequence files are read. For data in HBase, data are pulled mainly via HBase clients, saved into RDDs after being transformed, and distributed into multiple slices, and then a distributed computing is performed with a RDD operator. In this way, data will be transmitted over the network repeatedly, thus IO redundancy is caused and consuming time increases.

SUMMARY

An objective of the present application is to provide a task allocation method and task allocation apparatus for distributed data computing. In the method and apparatus, data storage information in a distributed database is taken as parameters for computing tasks, the computing tasks are allocated to storage nodes corresponding to the data storage information, and the data to which the computing tasks point is computed by the storage nodes. As only data in local memories needs to be called during the computing process, IO redundancy and consuming time due to repeated data forwarding are reduced.

To achieve the above-mentioned objective, the following technical solutions are adopted.

According to one aspect, a task allocation method for distributed data computing is provided, including:

receiving storage parameters for target data to be computed in distributed data;

mapping data slices of the target data to a resilient distributed dataset based on the storage parameters, each data slice corresponding to a partition in the resilient distributed dataset; and assigning partitions to storage nodes to generate computing tasks and perform the computing tasks.

According to another aspect, a task allocation apparatus for distributed data computing is provided, including:

a target data confirmation unit configured to receive storage parameters for target data in distributed data;

a target data mapping unit configured to map data slices of the target data to a resilient distributed dataset based on the storage parameters, each data slice corresponding to one partition in the resilient distributed dataset; and a computing task allocation unit configured to assign partitions to storage nodes to generate computing tasks and perform the computing tasks.

The present application provides an electronic device, including: a housing, a processor, a memory, a circuit board, and a power supply circuit, wherein, the circuit board is disposed inside a space enclosed by the housing; the processor and the memory are disposed on the circuit board; the power supply circuit is configured to supply power to circuits or devices of the electronic device; the memory is configured to store executable program codes; and the processor executes a program corresponding to the executable program codes by reading the executable program codes stored in the memory so as to perform the task allocation method for distributed data computing.

The present application further provides an application program for performing the task allocation method for distributed data computing when being executed.

The present application further provides a storage medium for storing an application program for performing the task allocation method for distributed data computing when being executed.

The present application provides the following benefits: because in the computing process, data storage information in a distributed database is taken as parameters for computing tasks, the computing tasks are allocated to storage nodes corresponding to the data storage information, and the data to which the computing tasks point is computed by the storage node, only data in local memories needs to be called so that IO redundancy and time consumed due to repeated data forwarding are reduced.

DETAILED DESCRIPTION

In order to make the objectives, technical solutions and advantages of the present application more clear, the present application will be explained in detail with reference to the accompanying drawings in combination of specific embodiments. It should be understood that these descriptions are merely exemplary and are not intended to limit the scope of the present application. In addition, descriptions of well-known structures and technologies are omitted in the following description to avoid unnecessarily obscuring the concept of the present application.

Figure 1:
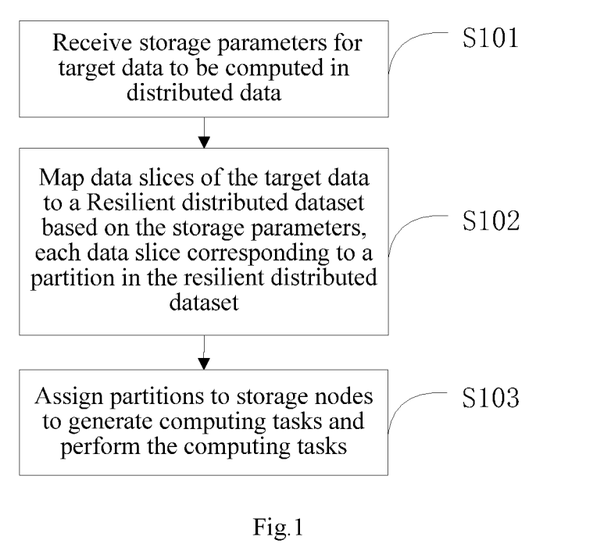
FIG. 1 is a method flow chart of a first embodiment of a task allocation method for distributed data computing provided in a specific implementation of the present application.

Reference may be made to FIG. 1, which is a method flow chart of a first embodiment of a task allocation method for distributed data computing provided in a specific implementation of the present application. The task allocation method in the embodiment is mainly used for parallel computing of large amounts of data in distributed databases to improve computing efficiency. As shown in the figure, the task allocation method includes S101-S103.

S101. Receive storage parameters for target data to be computed in distributed data.

The basic idea of distributed databases is that data previously stored in a centralized database is distributed to be stored on multiple data storage nodes connected via network, so as to obtain a larger storage capacity and allow a larger amount of concurrent accesses. A distributed database system generally uses relatively small computer systems. Each of computers may be separately placed at one location and have a full copy or a partial copy of DMBS (Database Management System), and its own local database. Numerous computers located at different locations are interconnected via the network, and together form a complete and global large database that is centralized logically but distributed physically.

Target data to be computed in distributed data is merely one or more data tables on one storage node, specifically, a segment of data in a data table. When a task is being allocated, a node to which a task is allocated needs only to read the start and end positions of the data to be processed in the data table, without centralization of all data thereto. If all the data is centralized to one node, data traffic of several TBs may be required. If only the storage parameters for the target data are centralized, only data traffic not larger than 5 M may be required, and thus the transfer of large data when data are centralized is avoided.

S102. Map data slices of the target data to a resilient distributed dataset based on the storage parameters, each data slice corresponding to one partition in the resilient distributed dataset.

Generally, the data to be processed is a segment of continuous records in a data table that are located on different storage nodes. In order to facilitate data processing and avoid the transfer of data, in a distributed database, all the data in each data slice are located on the same node. In the present solution, a data processing is performed in data slice as a basic data unit.

S103. Assign partitions to storage nodes to generate computing tasks and perform the computing tasks.

When a computing task is sent to storage nodes for processing, instead of randomly distributing the data to be processed to the storage nodes as in the prior art, the data to be processed is sent to the storage nodes corresponding to the data slices based on the storage information. Moreover, storage parameters related to the large amount of data, rather than the data per se are sent. Each storage node, after receiving a computing task, reads the data based on the table name of the target data table in which the data slice is located, and the start and end positions of the data slice, and then performs the computing task based on a computing mode. Throughout the computing process, all data seems to be read locally, thus IO redundancy may be reduced, and consuming time due to the redundancy is avoided.

In summary, data storage information in a distributed database is taken as parameters of computing tasks, the computing tasks are allocated to storage nodes corresponding to the data storage information, and the data to which the computing tasks point is computed by the storage nodes. As only data in local memories needs to be called during the computing process, IO redundancy and consuming time due to repeated data forwarding are reduced.

Figure 2:
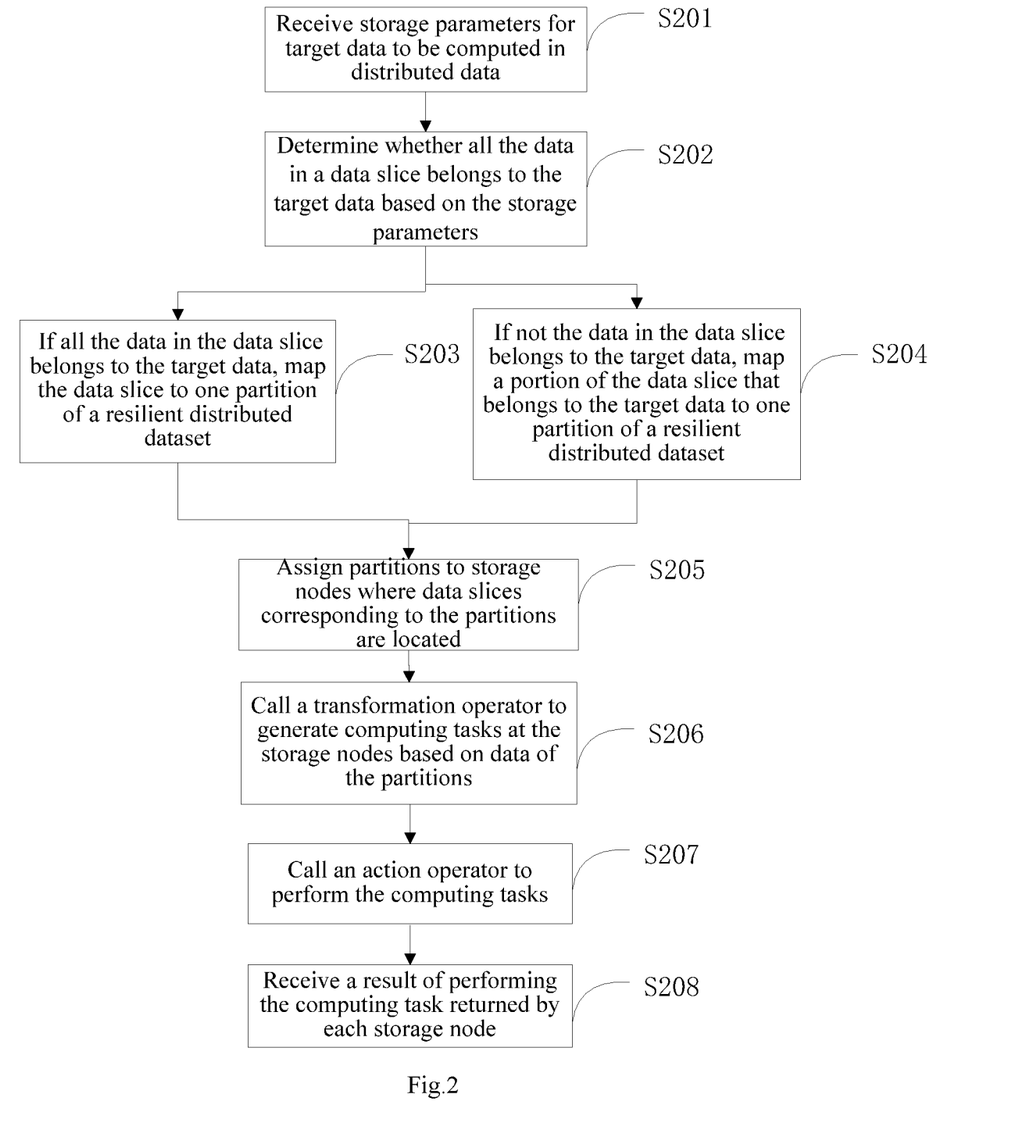
FIG. 2 is a method flow chart of a second embodiment of a task allocation method for distributed data computing provided in a specific implementation of the present application.

Reference may be made to FIG. 2, which is a method flow chart of a second embodiment of a task allocation method for distributed data computing provided in a specific implementation of the present application. As shown in the figure, the method includes S201-S208.

S201. Receive storage parameters for target data to be computed in distributed data.

The database for the distributed data is an HBase.

HBase is a distributed, column-oriented open-source database. HBase is different from a general relational database. HBase is a database suitable for non-structured data storage. Furthermore, HBase is column-based rather than row-based.

The HBase-based solution in the present embodiment can be considered as: customizing a resilient dataset, dividing the resilient dataset based on data partitioning rules of HBase and the range of target data inputted by a user, mapping data slices of an HBase data table to partitions of the resilient dataset, and designating processing nodes for the data in the partitions. When the distributed computing of data in an HBase data table is performed using a parallel computing framework (such as Spark), data processed by a task at each working node of Spark is Hbase data in the memory of the node. Distributed memory parallel computing of HBase data is finally achieved.

S202. Determine whether all the data in a data slice belongs to the target data based on the storage parameters.

In a distributed database, as records in a data table increase, the data table will split into multiple data slices, and the data in each data slice is stored on one storage node. Specifically, in an HBase, when a data table becomes large as the number of records increases, it will gradually split into multiple regions. Each region is denoted by [startkey,endkey], wherein, startkey and endkey denote respectively the start and end positions of the region. Different regions will be assigned by Master to corresponding RegionServers to be managed. The storage information is equivalent to information of the RegionServers.

In the present solution, the target data is associated with at least two data slices. If all the target data are located on the same storage node, a computing task can be sent directly to the storage node without parallel computing.

As all the data in a single data slice may not belong to the target data to be computed, in actual computing, the data in a data slice need to be calibrated to map the data to be processed to a resilient distributed dataset. One partition of the resilient distributed dataset corresponds to a data slice. All the data in the resilient distributed dataset belongs to the target data to be processed.

S203. If all the data in the data slice belongs to the target data, map the data slice to one partition of a resilient distributed dataset.

S204. If not all the data in the data slice belongs to the target data, map a part of data in the data slice that belongs to the target data to one partition of a resilient distributed dataset.

Because information related to a storage node for a data slice is already recorded in the data slice, a partition will carry the information related to the storage node when the data slice is mapped to the partition.

S205. Assign partitions to storage nodes where data slices corresponding to the partitions are located.

Because each partition is mapped to a data slice and carries the storage information corresponding to the data slice, this partition can be assigned to the corresponding storage node directly based on the storage information.

S206. Call a transformation operator to generate computing tasks at the storage nodes based on the data in the partitions.

The data list of the computing task of a data slice can be obtained based on the information related to the storage node for the data slice and target data information recorded in the data slice.

S207. Call an action operator to perform the computing tasks.

A computing task is already generated on each storage node. The computing task of each storage node calls the data related to the computing task at the storage node based on the data list of the computing task to perform the computing task.

S208. Receive a result of performing the computing task returned by each storage node.

The result of performing the computing task at each storage node needs to be collected, or the result can be cached by each storage node for use in iteration.

Figure 3:
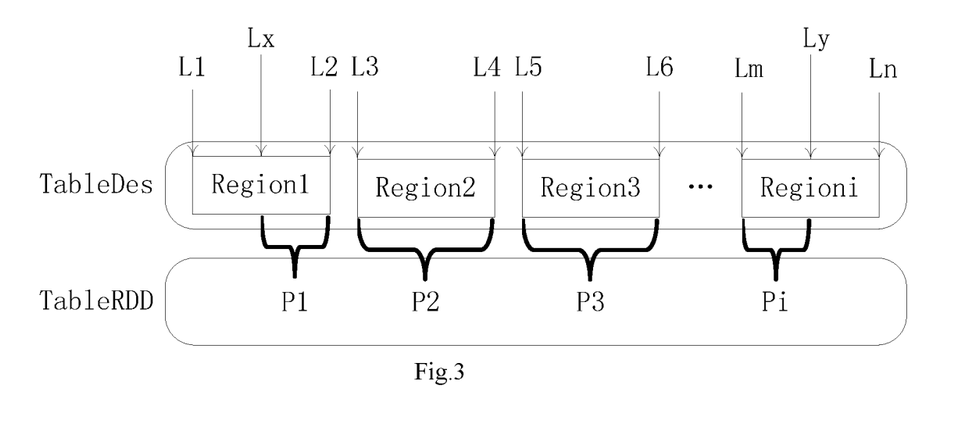
FIG. 3 is a structural schematic diagram of data in the second embodiment of a task allocation method for distributed data computing provided in a specific implementation of the present application
Figure 4:
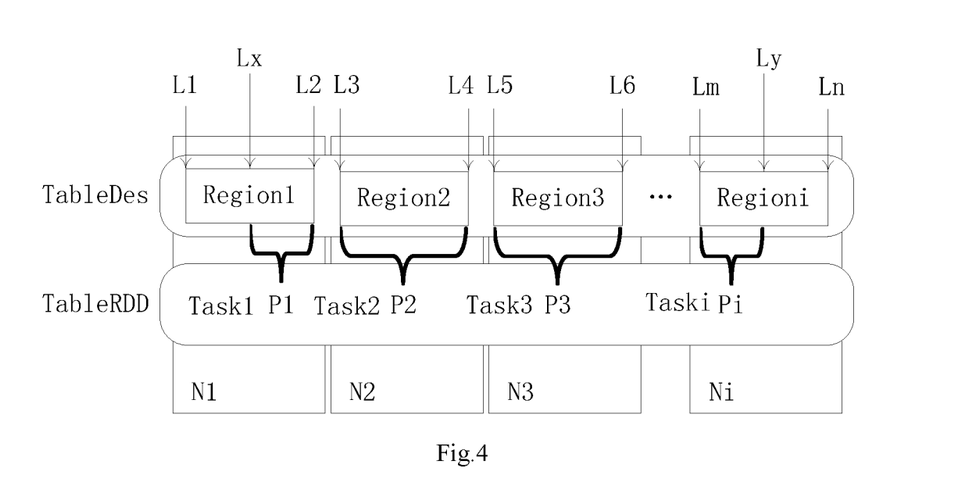
FIG. 4 is a schematic schematic diagram of tasks in the second embodiment of a task allocation method for distributed data computing provided in a specific implementation of the present application.

The present solution is further described in conjunction with FIGS. 3 and 4, with respect to the processing process of the task allocation method in the HBase.

Before a computing task is allocated, the name of the target data table of the target data, the start position of the target data in the target data table, and the end position of the target data in the target data table are obtained. The structure of the target data table is shown in FIG. 3, wherein, TableDes denotes the name of the target data table, Lx denotes the start position of the target data, and Ly denotes the end position of the target data. At least two data slices associated with the target data are obtained, i.e., the data slices Region1, Region2, Region3, . . . , Regioni in FIG. 3. The start and end positions of each data slice Regioni are, respectively, Lm, Ln (m=2i−1, n=2i), i.e., the start and end positions of the data slice in the HBase. Then, after invalid data in the data slices are removed, more precise partitions P1, P2, P3, . . . , Pi are obtained. The start and end positions of partitions are also used as parameters to create the partitions of a resilient distributed dataset. The relationship between the data slices and the partitions is as shown in FIG. 3. The data in intervals indicated by [L1, Lx] and [Ly, Ln] as shown in the FIG. 3 are the invalid data.

The data in Region in the HBase is mapped into the partitions of the resilient distributed dataset, wherein one partition is created for each Region and accordingly one computing task will be generated. The node Ni where Regioni is located is obtained according to information of Regioni. Regioni corresponds to the partition Pi of the resilient distributed dataset. When an optimal processing node of Pi is selected, the node is designated by Ni. Transformation operators of the storage nodes are called to generate computing tasks Task1, Task2, Task3, . . . , Taski of all the partitions P1, P2, P3, . . . , Pi in the resilient distributed dataset. A Task is generated based on a partition, and is located on the same storage node as the data of corresponding partition. Thus, it is ensured that the storage node processing the data in Regioni is the storage node where Regioni is located. The corresponding relationship among the data slice Regioni of the HBase, the partition Pi (data slice Pi) of the resilient distributed dataset, the storage node Ni, and the task Taski is as shown in FIG. 4.

On the storage node Ni, Pi reads the Regioni data in the memory on the node, and Taski processes the data in partition Pi. Node Ni performs the task Taski, and obtains and returns a result Ri. Also, Node Ni may caches intermediate result for use in iteration.

In addition, the cached intermediate result is used for iteration without needing to perform computation from scratch, which can effectively increase computing efficiency.

An action operator is called to perform tasks Task 1, Task 2, Task 3, . . . , Taski to conduct different operations. The result data of all tasks are collected by the resilient distributed dataset to complete the computing tasks.

Overall, the larger the amount of the data to be processed is, the more significant the technical effects of the present solution will be. When sending 1 M data becomes sending storage information of 1 M data, the reduction of IO redundancy and consuming time may be not very significant. However, when sending 1 G or even 1 T data becomes sending storage information of 1 G or even 1 T data, the reduction of IO redundancy and consuming time will be very significant.

In summary, data storage information in a distributed database is taken as parameters of computing tasks, the computing tasks are allocated to storage nodes corresponding to the data storage information, and the data to which the computing tasks point is computed by the storage nodes. As only data in a local memory needs to be called during the computing process, IO redundancy and consuming time due to repeated data forwarding are reduced.

Below are embodiments of a task allocation apparatus for distributed data computing provided in a specific implementation of the present application. The embodiments of the task allocation apparatus are based on the above-described embodiments of the task allocation method. Reference may be made to the above-described embodiments of the task allocation method, for contents that are not described in detail in the embodiments of task allocation apparatus.

Figure 5:
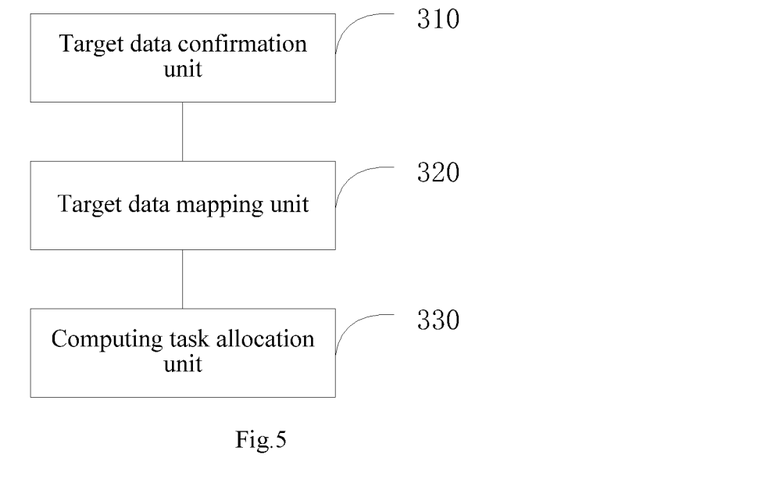
FIG. 5 is a structural block diagram of a first embodiment of a task allocation apparatus for distributed data computing provided in a specific implementation of the present application.

Reference may be made to FIG. 5, which is a structural block diagram of a first embodiment of a task allocation apparatus of distributed data computing provided in a specific implementation of the present application. As shown in FIG. 5, the task allocation apparatus includes:

a target data confirmation unit 310, configured to receive storage parameters for target data to be computed in distributed data;

a target data mapping unit 320, configured to map data slices of the target data to a resilient distributed dataset based on the storage parameters, each data slice corresponding to one partition in the resilient distributed dataset; and a computing task allocation unit 330, configured to assign partitions to storage nodes to generate computing tasks and perform the computing tasks.

In the present solution, any storage node may distribute a computing task and any other authorized clients can select data to distribute computing tasks based on user's needs. Because clients per se do not concern the transfer and access of data, the solution may be implemented substantially on all terminal devices that can access a distributed database via a network, achieving more widespread use of the database.

In summary, with the above-described units working cooperatively, data storage information in a distributed database is taken as parameters for computing tasks, the computing tasks are allocated to storage nodes corresponding to the data storage information, and the data to which the computing tasks point is computed by the storage nodes. As only data in a local memory needs to be called during the computing process, IO redundancy and consuming time due to repeated data forwarding are reduced.

Figure 6:
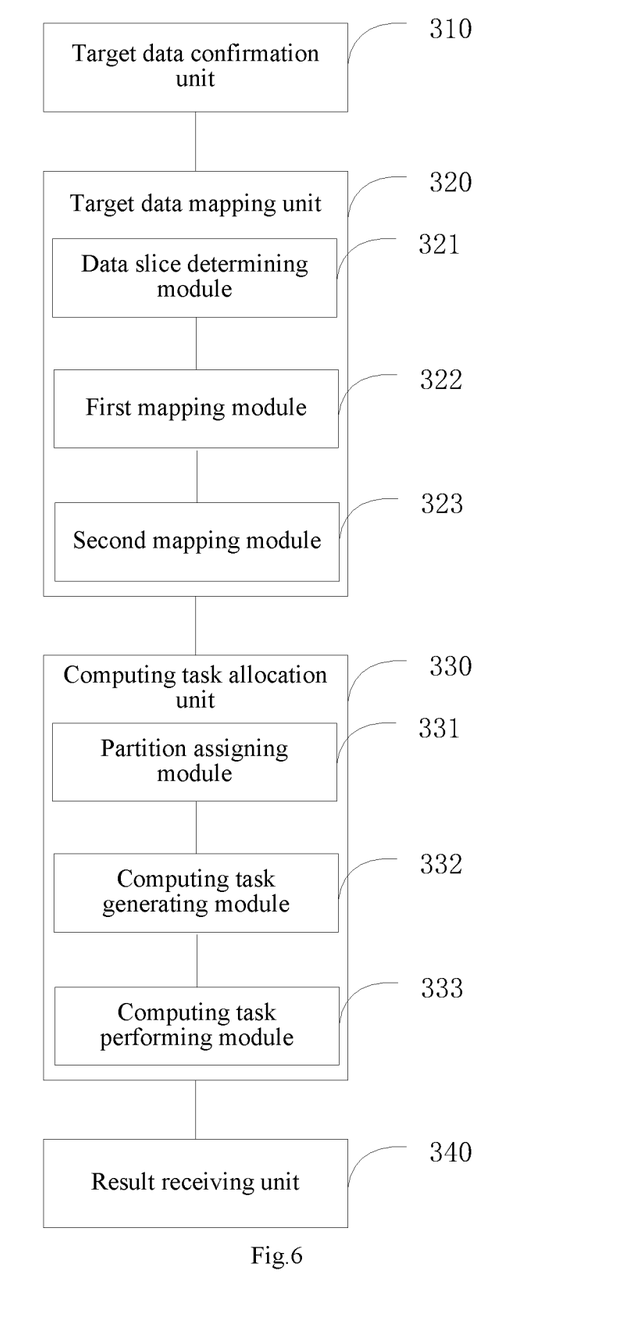
FIG. 6 is a structural block diagram of a second embodiment of a task allocation apparatus for distributed data computing provided in a specific implementation of the present application.

Reference may be made to FIG. 6, which is a structural block diagram of a second embodiment of a task allocation apparatus for distributed data computing provided in a specific implementation of the present application. As shown in FIG. 6, the task allocation apparatus includes:

a target data confirmation unit 310, configured to receive storage parameters for target data to be computed in distributed data;

a target data mapping unit 320, configured to map data slices of the target data to a resilient distributed dataset based on the storage parameters, each data slice corresponding to one partition in the resilient distributed dataset; and a computing task allocation unit 330, configured to assign partitions to storage nodes to generate computing tasks and perform the computing tasks.

The target data mapping unit 320 includes:

a data slice determining module 321, configured to determine whether all the data in each data slice belongs to the target data based on the storage parameters;

a first mapping module 322, configured to map the data slice to one partition of the resilient distributed dataset if all the data in the data slice belongs to the target data; and a second mapping module 323, configured to map a portion of the data slice that belongs to the target data to one partition of the resilient distributed dataset if not all the data slice belongs to the target data.

The computing task allocation unit 330 includes:

a partition assigning module 331, configured to assign partitions to storage nodes where data slices corresponding to the partitions are located;

a computing task generating module 332, configured to call a transformation operator to generate computing tasks at the storage nodes based on data in the partitions; and a computing task performing module 333, configured to call an action operator to perform the computing tasks.

The apparatus further includes:

a result receiving unit 340, configured to receive a result of performing the computing task returned by each storage node.

The database of the distributed data is an HBase.

In summary, with the above-described units and modules working cooperatively, data storage information in a distributed database is taken as parameters for computing tasks, the computing tasks are allocated to storage nodes corresponding to the data storage information, and the data to which the computing tasks point is computed by the storage nodes. As only data in a local memory needs to be called during the computing process, IO redundancy and consuming time due to repeated data forwarding are reduced.

Embodiments of the present application provide an electronic device including: a housing, a processor, a memory, a circuit board, and a power supply circuit, wherein, the circuit board is disposed inside the space enclosed by the housing; the processor and the memory are disposed on the circuit board; the power supply circuit is used to supply power to various circuits or devices of the electronic device; the memory is used to store executable program codes; and the processor executes a program corresponding to the executable program codes by reading the executable program codes stored in the memory, so as to cause the processor to:

receive storage parameters for target data to be computed in distributed data;

map data slices of the target data to a resilient distributed dataset based on the storage parameters, each data slice corresponding to one partition of the resilient distributed dataset; and assign partitions to storage nodes to generate computing tasks and perform the computing tasks.

The specific performing process of the above steps by the processor and the steps that can be further performed by the processor by executing the executable program codes can be obtained with reference to the description of the embodiments shown in FIG. 1-6 of the present application, and are thus omitted here.

In can be seen from the above that, in embodiments of the present application, data storage information in a distributed database is taken as parameters for computing tasks, the computing tasks are allocated to storage nodes corresponding to the data storage information, and the data to which the computing tasks point is computed by the storage nodes. As only data in local memories needs to be called during the computing process, IO redundancy and consuming time due to repeated data forwarding are reduced.

The electronic device can exist in many forms, including but not limited to:

(1) mobile communication devices: this type of device is characterized by having mobile communication functions, with primary purposes to provide voice and data communication. Such terminals include: smart phones (e.g., iPhone), multimedia phones, functional phones, low-end phones, and the like.

(2) ultra-mobile personal computer devices: this type of device belongs to the category of personal computers, has computing and processing functions, and generally also has mobile network properties. Such terminals include: PDA, MID, UMPC (e.g., iPad) and the like.

(3) portable entertainment devices: this type of devices can display and play multimedia contents. Such devices include: audio and video players (e.g., iPod), Portable Game Console, ebooks, and smart toys and portable onboard navigation devices.

(4) servers which are devices that provide computing services, and are composed of a processor, a hard disk, a RAM, a system bus and the like. The architecture of a server is similar to that of a general computer, but because it needs to provide highly reliable services, it has relatively high requirements in terms of processing capacity, stability, reliability, security, expandability, manageability and the like.

(5) other electronic devices that have a data interaction function.

Embodiments of the present application provide an application program for performing the task allocation method for distributed data computing provided by embodiments of the present application when being executed, wherein, the task allocation method for distributed data computing includes:

receiving storage parameters for target data to be computed in distributed data;

mapping data slices of the target data to a resilient distributed dataset based on the storage parameters, each data slice corresponding to one partition of the resilient distributed dataset; and assigning partitions to storage nodes to generate computing tasks and perform the computing tasks.

In an implementation of the present application, in the task allocation method for distributed data computing performed when the above-described application program is being executed, mapping data slices of the target data to a resilient distributed dataset based on the storage parameters, each data slice corresponding to one partition of the resilient distributed dataset, includes:

determining whether all the data in a data slice belongs to the target data based on the storage parameters;

mapping the data slice to one partition of the resilient distributed dataset if all the data in the data slice belongs to the target data; and mapping a portion of the data slice that belongs to the target data to one partition of the resilient distributed dataset, if not all the data in the data slice belongs to the target data.

In an implementation of the present application, in the task allocation method for distributed data computing performed when the above-described application program is being executed, assigning partitions to storage nodes to generate computing tasks and perform the computing tasks includes:

assigning partitions to storage nodes where data slices corresponding to the partitions are located;

calling a transformation operator to generate computing tasks at the storage nodes based on data in the partitions; and calling an action operation to perform the computing tasks.

In an implementation of the present application, in the task allocation method for distributed data computing performed when the above-described application program is being executed, after assigning partitions to storage nodes to generate computing tasks and perform the computing tasks, the method further includes:

receiving results of performing the computing tasks returned by the storage nodes.

In an implementation of the present application, in the task allocation method for distributed data computing performed when the above-described application program is being executed, the database of the distributed data is an HBase.

In embodiments of the present application, the above-described application program takes data storage information in a distributed database as parameters of computing tasks, allocates the computing tasks to storage nodes corresponding to the data storage information, and computes the data to which the computing tasks point by the storage nodes. As only data in local memories needs to be called during the computing process, IO redundancy and consuming time due to repeated data forwarding are reduced.

Embodiments of the present application provide a storage medium for storing an application program for performing the task allocation method for distributed data computing provided by embodiments of the present application when being executed. The task allocation method for distributed data computing includes:

receiving storage parameters for target data to be computed in distributed data;

mapping data slices of the target data to a resilient distributed dataset based on the storage parameters, each data slice corresponding to one partition of the resilient distributed dataset; and assigning partitions to storage nodes to generate computing tasks and perform the computing tasks.

In an implementation of the present application, in the task allocation method for distributed data computing performed by the application program stored in the above-described storage medium, mapping data slices of the target data to a resilient distributed dataset based on the storage parameters, each data slice corresponding to one partition of the resilient distributed dataset, includes:

determining whether all the data in a data slice belongs to the target data based on the storage parameters;

mapping the data slice to one partition of the resilient distributed dataset if all the data in the data slice belongs to the target data; and mapping a portion of the data slice that belongs to the target data to one partition of the resilient distributed dataset, if not all the data in the data slice belongs to the target data.

In an implementation of the present application, in the task allocation method for distributed data computing performed by the application program stored in the above-mentioned storage medium, assigning partitions to storage nodes to generate computing tasks and perform the computing tasks includes:

assigning the partitions to the storage nodes where the data slices corresponding to the partitions are located;

calling a transformation operator to generate the computing tasks at the storage nodes based on data in the partitions; and calling an action operator to perform the computing tasks.

In an implementation of the present application, in the task allocation method for distributed data computing performed by the application program stored in the above-described storage medium, after assigning partitions to storage nodes to generate computing tasks and perform the computing tasks, the method further includes:

receiving results of performing the computing tasks returned by the storage nodes.

In an implementation of the present application, in the task allocation method for distributed data computing performed when the application program stored in the above-described storage medium, the database of the distributed data is an HBase.

In embodiments of the present application, the above-described storage medium is used for storing the above-described application program. The program takes data storage information in a distributed database as parameters of computing tasks, allocates the computing tasks to storage nodes corresponding to the data storage information, and computes the data to which the computing tasks point by the storage nodes. As only data in local memories needs to be called during the computing process, IO redundancy and consuming time due to repeated data forwarding are reduced.

It should be understood that the above embodiments are only exemplary description or explanation for the principle of the present application and not intended to limit the present application. Any modifications, equivalent substitutions, improvements within the spirit and scope of the present application all fall within the scope of protection of the present application. In addition, the appended claims are intended to include all variants and modifications which fall within the scope and boundary of the appended claims or the equivalent of the scope and boundary of the appended claims.

Although the embodiments of the present application are described in details, it should be understood that various modifications, substitutions, improvements can be made to the embodiments of the present application without departing from the spirit and scope of the present application.

The invention claimed is:

1. A task allocation method for distributed data computing, comprising:

receiving storage parameters for target data to which computation points in distributed data, wherein the storage parameters include a name of a target data table of the target data, a start position of the target data in the target data table, and an end position of the target data in the target data table, wherein the distributed data is stored on storage nodes;

searching for data slices associated with the target data based on the storage parameters;

mapping the found data slices associated with the target data to a resilient distributed dataset based on the storage parameters, each data slice corresponding to one partition in the resilient distributed dataset; and assigning the partitions corresponding to the data slices associated with the target data to storage nodes where the data slices associated with the target data are located to generate computing tasks and perform the computing tasks, wherein each of the partitions is mapped to one of the data slices associated with the target data and carries storage information corresponding to the data slice, so that this partition can be assigned to the corresponding storage node directly based on the storage information, wherein, mapping the data slices associated with the target data to the resilient distributed dataset based on the storage parameters comprises:

determining whether all the data in each data slice belongs to the target data based on the storage parameters;

mapping the data slice to one partition of the resilient distributed dataset, when all the data in the data slice belongs to the target data;

mapping a portion of the data slice that belongs to the target data to one partition of the resilient distributed dataset, when not all the data in the data slice belongs to the target data, wherein the portion of the data slice is obtained by removing invalid data in the data slice based on the start position of the target data, the end position of the target data, a start position of the data slice, and an end position of the data slice, wherein, assigning partitions to storage nodes to generate computing tasks and perform the computing tasks comprises:

assigning the partitions to the storage nodes where the data slices corresponding to the partitions are located;

calling a transformation operator to generate computing tasks at the storage nodes based on data in the partitions; and calling an action operator to perform the computing tasks.

2. The task allocation method for distributed data computing of claim 1, wherein, after assigning partitions to storage nodes to generate computing tasks and perform the computing tasks, the method further comprises:

receiving results of performing the computing tasks returned by the storage nodes.

3. The task allocation method for distributed data computing of claim 1, wherein, a database of the distributed data is an HBase.

4. A non-transitory storage medium for storing an application program for performing the task allocation method for distributed data computing of claim 1 when being executed.

5. An electronic device, comprising: a housing, a processor, a memory, a circuit board, and a power supply circuit, wherein, the circuit board is disposed inside a space enclosed by the housing; the processor and the memory are disposed on the circuit board;

the power supply circuit is configured to supply power to each circuit or device of the electronic device; the memory is configured to store executable program codes; and the processor executes a program corresponding to the executable program codes by reading the executable program codes stored in the memory to perform operations of:

receiving storage parameters for target data to which computation points in distributed data, wherein the storage parameters include a name of a target data table of the target data, a start position of the target data in the target data table, and an end position of the target data in the target data table, wherein the distributed data is stored on storage nodes;

searching for data slices associated with the target data based on the storage parameters;

mapping the found data slices associated with the target data to a resilient distributed dataset based on the storage parameters, each data slice corresponding to one partition in the resilient distributed dataset; and assigning the partitions corresponding to the data slices associated with the target data to storage nodes where the data slices associated with the target data are located to generate computing tasks and perform the computing tasks, wherein each of the partitions is mapped to one of the data slices associated with the target data and carries storage information corresponding to the data slice, so that this partition can be assigned to the corresponding storage node directly based on the storage information, wherein, the operation of mapping the data slices associated with the target data to the resilient distributed dataset based on the storage parameters comprises:

determining whether all the data in each data slice belongs to the target data based on the storage parameters;

mapping the data slice to one partition of the resilient distributed dataset, when all the data in the data slice belongs to the target data;

mapping a portion of the data slice that belongs to the target data to one partition of the resilient distributed dataset, when not all the data in the data slice belongs to the target data, wherein the portion of the data slice is obtained by removing invalid data in the data slice based on the start position of the target data, the end position of the target data, a start position of the data slice, and an end position of the data slice, wherein, assigning partitions to storage nodes to generate computing tasks and perform the computing tasks comprises:

assigning the partitions to the storage nodes where the data slices corresponding to the partitions are located;

calling a transformation operator to generate computing tasks at the storage nodes based on data in the partitions; and calling an action operator to perform the computing tasks.

6. The electronic device of claim 5, wherein, after assigning partitions to storage nodes to generate computing tasks and perform the computing tasks, the processor is caused to perform an operation of:

receiving results of performing the computing tasks returned by the storage nodes.

7. The electronic device of claim 5, wherein, a database of the distributed data is an HBase.

* * * * *